US010834135B1

(12) United States Patent
Chhabra

(10) Patent No.: US 10,834,135 B1
(45) Date of Patent: Nov. 10, 2020

(54) SUGGESTING ACCESS POLICIES FOR WEB SERVICES BASED ON TEST MODE DATA

(71) Applicant: Amazon Technologies, Inc., Seattle, WA (US)

(72) Inventor: Jasmeet Chhabra, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 15/805,373

(22) Filed: Nov. 7, 2017

(51) Int. Cl.
*H04L 29/06* (2006.01)
*G06N 20/00* (2019.01)

(52) U.S. Cl.
CPC ............ *H04L 63/20* (2013.01); *G06N 20/00* (2019.01); *H04L 63/108* (2013.01); *H04L 63/1433* (2013.01)

(58) Field of Classification Search
CPC ... H04L 63/20; H04L 63/108; H04L 63/1433; G06N 20/00
See application file for complete search history.

(56) References Cited

U.S. PATENT DOCUMENTS

| | | | | |
|---|---|---|---|---|
| 9,077,758 B1* | 7/2015 | McGovern | ............... | H04L 63/14 |
| 9,258,312 B1* | 2/2016 | O'Neill | ................. | G06F 21/604 |
| 9,641,880 B1* | 5/2017 | Scurtu | .................. | H04N 21/254 |
| 10,122,757 B1* | 11/2018 | Kruse | ..................... | H04L 63/10 |
| 10,320,624 B1* | 6/2019 | Roth | ...................... | H04L 63/101 |
| 2004/0193606 A1* | 9/2004 | Arai | ....................... | G06F 21/604 |
| 2005/0172034 A1* | 8/2005 | Sakai | ....................... | G06F 16/95 |
| | | | | 709/250 |
| 2008/0154663 A1* | 6/2008 | Savur | ................... | G06Q 10/107 |
| | | | | 705/7.13 |
| 2008/0228861 A1* | 9/2008 | Tadauchi | ............... | G06Q 10/10 |
| | | | | 709/203 |
| 2009/0276204 A1* | 11/2009 | Kumar | ................ | H04L 63/0227 |
| | | | | 703/21 |
| 2009/0320108 A1* | 12/2009 | Livingston | .............. | G06F 21/31 |
| | | | | 726/6 |
| 2010/0257579 A1* | 10/2010 | Karjoth | ................ | G06F 21/6227 |
| | | | | 726/1 |
| 2011/0047274 A1* | 2/2011 | Kuo | ....................... | G06F 15/173 |
| | | | | 709/226 |
| 2011/0055134 A1* | 3/2011 | Dvorak | ............... | G06F 11/2294 |
| | | | | 706/47 |
| 2013/0125199 A1* | 5/2013 | Novak | ................... | G06Q 10/04 |
| | | | | 726/1 |

* cited by examiner

*Primary Examiner* — Vance M Little
(74) *Attorney, Agent, or Firm* — Lowenstein Sandler LLP

(57) ABSTRACT

A method and system for generating access policy suggestions are described. The system initiates a test mode for a web service to be access by a user. The system authorizes access to the web service by the user in the test mode and records test data regarding the access to the web service by the user in the test mode. The system generates an access policy suggestion based on the test data.

20 Claims, 6 Drawing Sheets

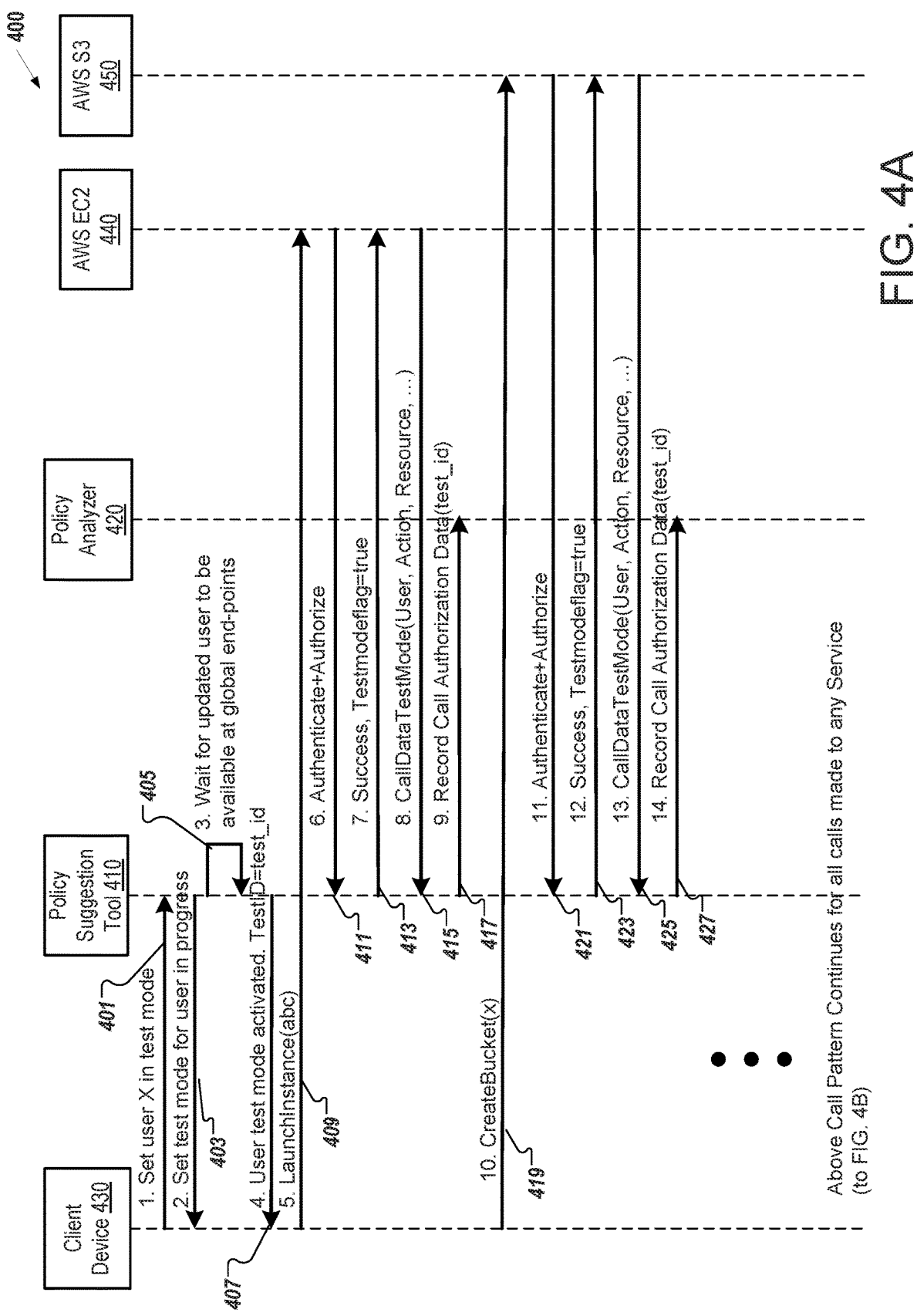

SUGGESTING ACCESS POLICIES FOR WEB SERVICES BASED ON TEST MODE DATA

BACKGROUND

Security to web services is an important aspect to customers of the web services. Access management systems are used to control access to web services and corresponding resources. Access management to web services may include access permissions to control access for various users and types of users to these services and resources. Access management to web services can be very complex. In some cases, a customer sets up controls to govern access to resources and services and gets frustrated with debugging complex permissions to figure out what will work. The customer may give up and set permissions that are too permissive for their needs.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only. Further, it should be understood that the drawings are not necessarily proportional or to scale.

FIGS. 4A-4B illustrate a flow diagram a flow of operations of with an access management system having a policy suggestion tool according to one embodiment.

DETAILED DESCRIPTION

Figure 1:
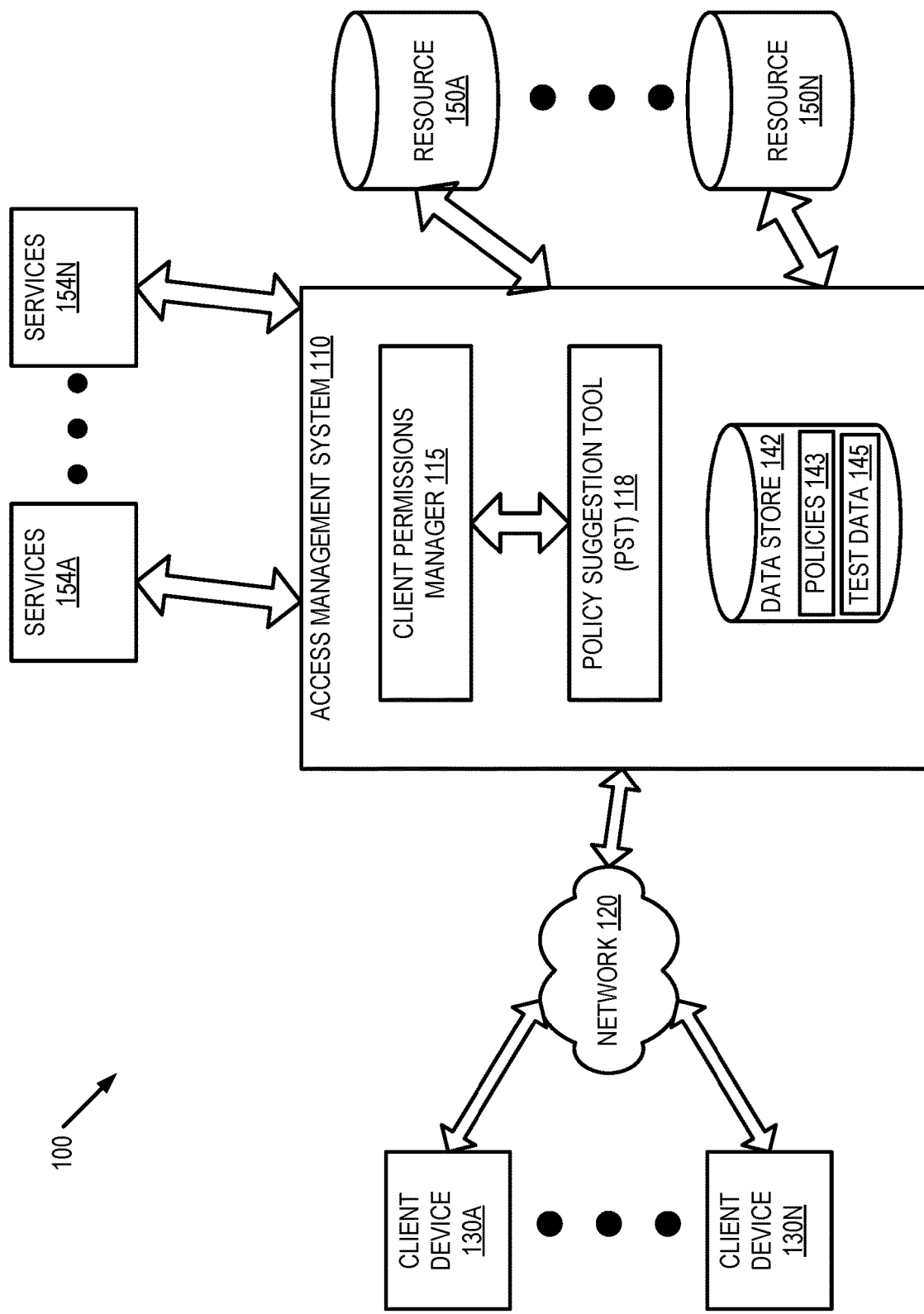
FIG. 1 is a block diagram of an example network architecture in which embodiments of a policy suggestion tool may operate.

Embodiments described herein relate to access management to web services and resources by an access management system having a policy suggestion tool (PST). The access management system can be a core service that allows customers to control security of other web services and resources on the cloud. The embodiments described herein are directed to running distributed web services in a test mode to record actions and related data as test data and analyzing the test data to provide policy suggestions to users. These embodiments can increase security of policies by providing less permissive policy suggestions and can help users debug complex authorization failures through the test mode. In one embodiment, the access management system receives a first request to initiate a test mode for access to web services. The web services may include computing services, storage services, database services, application services, or the like. The request may include user credentials of a test user. The access management system notifies the web services of the test mode and subsequently receives requests from the web services for authorization to perform an action or access a resource for the test user in the test mode. The access management system authorizes the requests and records test data regarding the requests. The access management system analyzes the test data to generate an access policy suggestion based on the test data. Alternatively, the embodiments described herein can record actions and related data as test data in the test mode for other purposes. For example, instead of providing policy suggestions for access control, the test data can be analyzed to determine resource usages and provide recommendations based on the usage patterns for purposes of provisioning resources or services, considering factors like bandwidth, data usage, service usage, or the like. For example, the usage patterns may indicate that the user can save cost of services by provisioning usages in a certain way based on the usage patterns.

As noted above, access management can be very complex and customers using an access management system can get frustrated with debugging complex permissions to figure out what access permissions are working. Consequently, many customers give up and set permissions that are too permissive for their needs. The embodiments described herein address the problem by introducing a test mode. In this test mode, an operator of the access management system can setup a test user in the test mode. The operator of the access management system can run an application with this test user's credentials. The operator can attempt many (or all) actions that would be performed in a production mode. In the test mode, the access management system can record the actions taken by the test user. The test data is data that is recorded that would help analyze the user's actions and accesses to make automated access policy suggestions. For example, this data may specify whether the authorization succeeded or not, what resources were accessed, what action was called, or the like. The access management system may include a policy analyzer services that analyzes the test data, including the actions taken by the test user, and provides suggested polices to the user. The access policies suggested are targeted to help user lock down the user's permissions. The policy analyzer service can also analyze the test data to help the operator figure out why certain actions are failing.

FIG. 1 is a block diagram of an example network architecture 100 in which embodiments of a policy suggestion tool (PST) 118 may operate. The network architecture 100 may include access management system 110 and a client device 130 capable of communicating with access management system 110 via a network 120. Network 120 may include, but is not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network 120 may have any suitable communication range associated therewith and may include, for example, public networks (e.g., the Internet), metropolitan area networks (MANs), wide area networks (WANs), local area networks (LANs), or personal area networks (PANs). In addition, the network 120 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Client device 130 may include any type of mobile computing device (e.g., that has a finite power source) or traditionally non-portable computing device. Client device 130 may be a mobile computing device such as a tablet computer, cellular telephone, personal digital assistant (PDA), portable media player, netbook, laptop computer, portable gaming console, motor vehicle (e.g., automobiles), wearable device (e.g., smart watch), and so on. Client device 130 may also be a traditionally non-portable computing device such as a desktop computer, a server computer, or the like. Client device 130 may be configured with functionality to enable execution of an application to interact with an access management system 110, including a client permissions manager 114, a policy suggestion tool (PST) 118, or both.

Communication between the access management system 110 and the client device 130 may be enabled via any communication infrastructure, such as public and private networks. One example of such an infrastructure includes a combination of a wide area network (WAN) and wireless infrastructure, which allows a user to use client device 130 to interact with access management system 110 without being tethered to the access management system 110 via hardwired links. The wireless infrastructure may be provided by one or multiple wireless communications systems. One of the wireless communication systems may be a wireless local area network (WLAN) access point connected with the network 120. Another of the wireless communication systems may be a wireless carrier system that can be implemented using various data processing equipment, communication towers, etc. Alternatively, or in addition, the wireless carrier system may rely on satellite technology to exchange information with the client device 130.

Access management system 110 may be set up by an entity such as a company or a public sector organization to provide identify and access management to one or more services (such as various types of cloud-based computing or storage) accessible via the Internet and/or other networks to client device 130. Access management system 110, and corresponding web services, may include numerous data centers hosting various resource pools, such as collections of physical and/or virtualized computer servers, storage devices, networking equipment and the like, needed to implement and distribute the infrastructure and services offered by the access management system 110, including to provide multi- and single-tenant services. In some embodiments, access management system 110 may implement the client permissions manager 115, policy suggestion tool 118, or both, to manage access to associated web services 154A-154N, provide access to other computing resources 150A-150N, such as a virtual compute service and storage services, such as object storage services, block-based storage services, data warehouse storage service, archive storage service, and/or any other type of network based services (which may include various other types of storage, processing, analysis, communication, event handling, visualization, and security services, such as a code execution service that executes code without client management of the execution resources and environment). Client device 130 may access these various services 154A-N and resources 150A-N via access management system 110, for example through an application programming interface (API) or a command line interface (CLI). Likewise network-based services may themselves communicate and/or make use of one another to provide different services.

Access management system 110 may include the client permissions manager 115 that controls one or more user's access to the services 154A-N, the resources 150A-N, or any combination thereof. The services 154A-N may include computing services, storage services, database services, application services, or the like. The resources 150A-N may include computing resources, storages resources, database resources, application resources, or the like. The client permissions manager 115 can be used to gran different permissions to different users for difference services and resources. For example, the client permissions manager 115 can be programmed to allow some users complete access to Amazon Elastic Compute Cloud (Amazon EC2), Amazon Simple Storage Service (Amazon S3), Amazon DynamoDB, Amazon Redshift, and other AWS services. For other users, the client permissions manager 115 can allow read-only access to just some S3 buckets, or permission to administer just some EC2 instances, or to access billing information, but nothing else. The client permissions manager 115 can be used to securely give applications that run on EC2 instances the credentials that they need in order to access other resources, like S3 buckets and RDS or DynamoDB databases. The client permissions manager 115 can be used to authenticate a user or a group of users and can be used to authorize actions to be performed by services for the user or authorize access to resources by those services or by the user directly using policies 143. The policies 143 can be stored in a data store 142 of one or more data repositories accessible by the components of the access management system 110. As described herein, the PST 118 can be used to generate access policy suggestions that can be used by the client permissions manager 115 to control access to the services 154A-N and resources 150A-N.

The access management system 110, and its corresponding components, can be accessed in one or more of the following ways: a management console that is a browser-based interface to manage the access management system 110, and corresponding services and resources; a command line tool that can be used to issue commands at a client device's command line to perform access management tasks. The command line tool can also be used in connection with scripts to perform tasks. The access management system 110 may also include an application programming interface (API) to permit requests directly to the service. This API may be an HTTP-based API in which the requests are HTTP requests made directly to the services. Alternatively, other libraries and code can be used to create programmatic access to the access management system 110.

The client permissions manager 115 can use access policies to govern access to the services 154A-N and resources 150A-N. For example, the client permissions manager 115 may receive a request from a service 150A to perform an action or access a resource 150A for a user of the service. The client permissions manager 115 can authenticate the user of the service and determine whether to authorize the authenticated user for this particular action or access to the resource 150.

As described above, the complexity of creating appropriate policies for a given user or group of users may be complex. The policy suggestion tool (PST) 118 can be used to generate policy suggestions for a user to be enforced by the client permissions manager 115. In one embodiment, the access management 110 can start the PST 118 in response to a request to initiate a test mode for access to web services. The request to initiate the test mode can specify a test user and include user credentials for the test user. The credentials may be that of an actual user. The PST 118 permits some time to make sure that all servers of the access management system 110 are notified of the test mode. In the test mode, the PST 118 can authorize requests, record test data, and suggest access policy recommendations based on the recorded test data. In particular, the PST 118 receives requests from one or more of the server 154A-N for authorization to perform an action or access one or more of the resources 150A-N for the test user in the test mode. The PST 118 can automatically authorize the requests and record test data 145 regarding the requests. The test data 145 can be stored in the data store 142, or alternatively, in a separate data store than the policies 143. The PST 118 analyzes the test data 145 to generate an access policy suggestion based on the test data. The access policy suggestion may also be stored in data store 142.

In another embodiment, the PST 118 sends the access policy suggestion to a client device 130. The PST 118 can receive a request to apply the access policy suggestion to a user. In another embodiment, the access policy suggestion can be applied to a resource. Alternatively, the access policy suggestion can be applied to a group of users, a role, a human user, a machine user, or the like. The access management system 110 or the PST 118 can receive a request to terminate the test mode for the test user and the access management 110 or PST 118 terminates the test mode for the test user.

In another embodiment, the PST 118 receives an authentication and authorization request from a first web service in response to a client request, received at the first web service, to perform the action or access the resource. The PST 118 receives call data regarding the client request from the first web service. The call data may include a user identifier, an action identifier, and a resource identifier. The PST 118 records the call data for the client request. The PST 118 creates the access policy suggestion using the call data that specifies at least the action identifier and the resource identifier.

In another embodiment, the PST 118 generates a permission access response that authenticates the test user and authorizes a first web service to perform any action and access any resource for the test user in the test mode. The PST 118 receives a first request from the first web service to authenticate the test user and authorize a first action and access a first resource for the test user in the test mode. The PST 118 authorizes the first request and records test data 145 associated with the first request. The PST 118 analyzes the test data 145 and generates the access policy suggestion based on the first request, where the access policy suggestion includes an authorization for the first action and for access to the first resource.

In another embodiment, the PST 118 receives a first request to initiate a test mode for access to web services and receives a second request from a first web service for authorization to perform an action or access a resource for the test user in the test mode. The PST 118 authorizes the second request and records test data regarding the second request. The PST 118 analyzes the test data to generate an access policy suggestion based on the test data. In a further embodiment, the PST 118 generates a permission access response that authenticates the test user and authorizes the first web service to perform any action and access any resource for the test user in the test mode. The second request may include an authentication request to authenticate the test user and an authorization request to authorize a first action and access a first resource for the test user in the test mode. The PST 118 generates the access policy suggestion based on the first request. The access policy suggestion may include an authorization for the first action and for access to the first resource.

The access management system 110 is eventually consistent and can achieve high availability by replicating data across multiple servers within data centers around the world. If a request to change some data is successful, the change is committed and safely stored. However, the change must be replicated across all access management system servers, which can take some time. Such changes include creating or updating users, groups, roles, or policies. Changes, for example, can be made in a separate initialization or setup routine and actions can be taken to verify that the changes have been propagated before production workflows depend on them.

Figure 2:
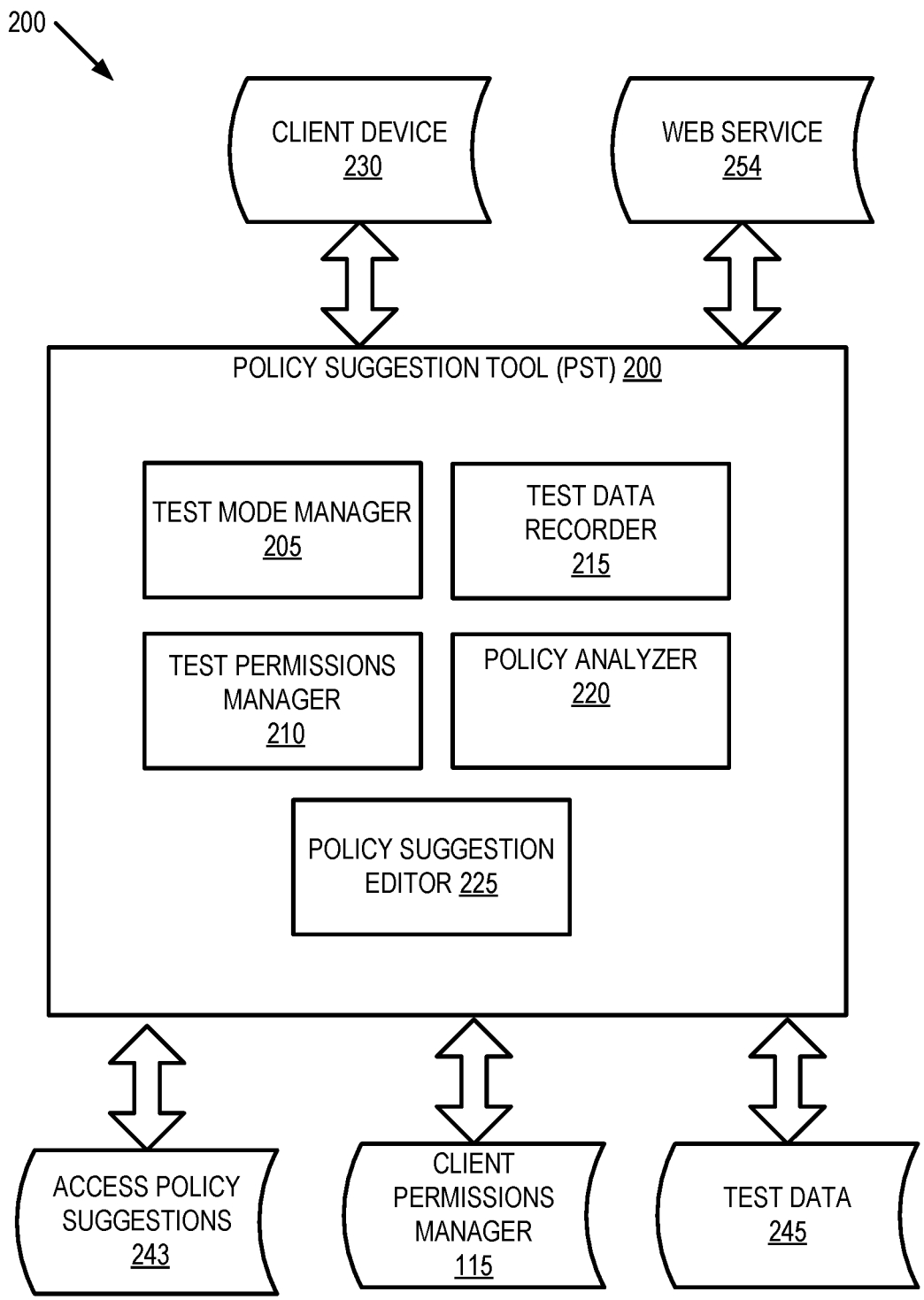
FIG. 2 is a block diagram of a logical view of a policy suggestion tool (PST), in accordance with one embodiment.

FIG. 2 is a block diagram of a logical view of a policy suggestion tool (PST) 200, in accordance with one embodiment. PST 200 may correspond to the PST 118 of FIG. 1. In some embodiments PST 200 may include a test mode manager 205, a test permissions manager 210, a test data recorder 210, a policy analyzer 220, and a policy suggestion editor 225. Collectively the components of the PST 200 may provide policy suggestions. The functionality of the individual components described with respect to FIG. 2 may be integrated into one more software components. The PST 200 may also include other software components, such as an API, a CLI, or the like.

In one embodiment, the test mode manager 205 can receive a request to initiate a test mode, as well as a request to terminate the test mode. For example, the test mode manager 205 can receives a request from the client device 230 to set a test user (user X) into a test mode and the test mode manager 205 can initiate the test mode and acknowledge with a response to the client device 230 that the test mode is set for the user and that the test mode is in progress. The test mode manager 205 can notify other components of the PST 200 that the test mode is in progress. The test mode manager 205 can notify the web services or other instances of the access management system that the test user is in test mode and can wait for a period to make sure that the updated user is available at global end points of the system. Alternatively, the test mode manager 205 does not have to wait for global end-points to be updated. However, in response to the user being updated and available at the global endpoints, the test mode manager 205 can notify the client device 230 that the user test mode is activated and ready. The test manager 205 can assign a test user identifier (TestID=test_id) for the test user and send this test user identifier to the client device.

The client device 230, while in test mode, can request a service to perform an action or access a resource. In response to a request received at the web service 254 from the client device 230, the web service 254 sends a request to authenticate and authorize the action, access, or both to the access management system 110. In response, the test permissions manager 210 of the PST 200 sends a response to indicate that the request to authenticate and authorize was successful, setting a test mode flag as true. In response the web service 254 sends the call data corresponding to the action and any resource being used to the PST 200. The test data recorder 215, as a result, records the call data as test data 245. The test data 245 may reflect the user, the action, and the resource being accessed by the web service 254. In one embodiment, the policy analyzer 220 (instead of the test data recorder 215) records the test data 245. The client device 230 can send zero or more additional requests for the same web service or different services to perform additional actions and access the same or different resources. The test data recorder 215 continues to record the call authorization data associated with the requests made by the user. At some point, the client device 230 sends a request to terminate the test mode for the test user. In response, the test mode manager 205 removes the test mode for the user in progress by responding to the client device 230 and waiting for the updated user to be available at the global end-points. The test mode manager 205 notifies the client 230 that the user test mode is deactivated. The PST 200 receives a request from the client device 230 to generate a policy suggestion for the user. In response, the policy analyzer 220 analyzes the test data 245 to create access policy suggestions 243 to be used by the client permissions manager 115 once accepted by the client device 230. The access policy suggestions 243 can be provided to the client device 230 for selection and editing. Using the policy suggestion editor 225, the client device 230 can select and edit the access policy suggestions 243. In response to a request from the client device 230, the policy suggestion editor 225 can apply the policy suggestion to a user (User Y) to be enforced by the client permissions manager 115 described above with respect to FIG. 1. It should be noted that this user is not a test user but an actual user of the web services. In another embodiment, the access policy suggestion can be applied to a resource. Alternatively, the access policy suggestion can be applied to a group of users, a role, a human user, a machine user, or the like.

The following description includes some examples of access policy suggestions for a test user with permissions for the web service EC2 and the recourse S3. The following example, shows that the test user is provided with all EC2 and S3 permissions (EC2* and S3* permissions) with the following statement:

"Statement": [
{
  "Effect": "Allow",
  "Action": [
    "ec2:*"
    "s3:*"
  ],
  "Resource": "*"
{

Then using the test user credentials, the user via the client device 230 performs the following two actions: EC2:Runinstances for machine image ami-xxxx and S3:PutObject on my_bucket. The PST 200 records the test data associated with these two actions and makes the following access policy suggestion for the two actions as follows:

```
"Statement": [
  {
    "Effect": "Allow",
    "Action": [
      "ec2:Runinstances "
    ],
    "Resource": ""'arn:aws:ec2:region::image/ami-xxxx"
"
  }
  {
    "Version": "2012-10-17",
    "Statement":[{
      "Effect": "Allow",
      "Action": "s3:PutObject",
      "Resource":[
      "arn:aws:s3:::my_bucket/*"]
    }
  ]
}
```

The operator can instruct/command the PST 200 to apply these access policy suggestions to the test user and the test mode can be run again to ensure that the access works as expected. The operator may also edit the access policy suggestion to either make the policy more or less permissive than what is suggested by the PST 200. As noted here, the access policy suggestion can be applied to a resource, a group of users, a role, a human user, a machine user, or the like.

As set forth herein, the PST 200 can run distributed web services in a test mode to record actions and related data and can analyze the test mode recordings to provide policy suggestions to the users. This may help increase the security of policies by providing less permissive policy suggestions automatically based on the test data. The PST 200 can also be used to help user debug complex authorization failures through the test mode. Additional details of the PST 200 are described below with respect to FIGS. 3, 4A, 4B.

Figure 3:
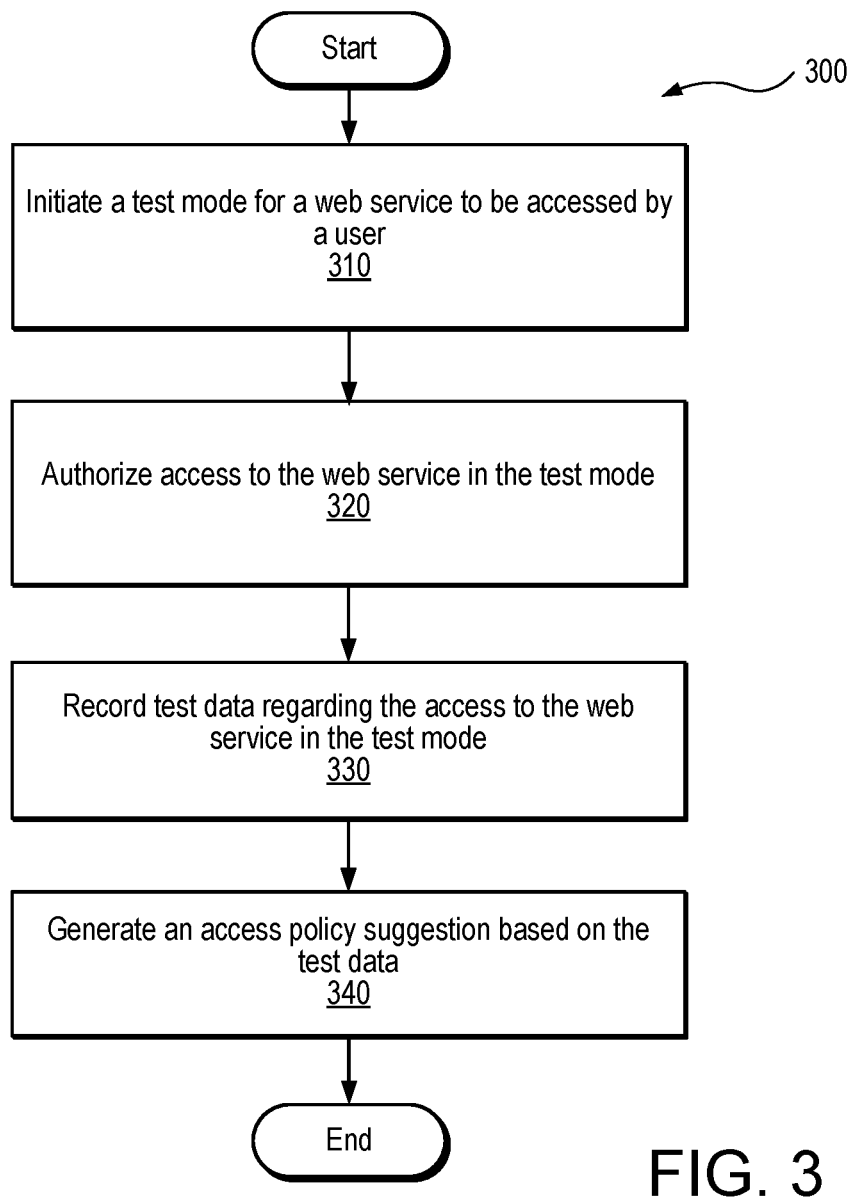
FIG. 3 illustrates a flowchart that provides an example of a process executed by a policy suggestion tool, according to various embodiments.

FIG. 3 illustrates a flowchart that provides an example of a process 300 executed by a policy suggestion tool, according to various embodiments. It is understood that the flowchart of FIG. 3 provides an example of the many different types of functional arrangements that may be employed to implement the operation of the policy suggestion tool as described herein. Process 300 may be performed by a processing logic that may comprise hardware (e.g., circuitry, dedicated logic, programmable logic, microcode, etc.), software (e.g., instructions run on a processing device), or a combination thereof. In one embodiment, the PST 118 of FIG. 1 executes the process 300 to generate access policy suggestions. In another embodiment, the PST 200 of FIG. 2 executes the process 300. In another embodiment, other components of the access management system 110 can perform some or all of the process 300.

Referring back to FIG. 3, the processing logic beings the process 300 by initiating a test mode for a web service to be accessed by a user (block 310). The processing logic receives requests from web services to authorize whether the user has access to the web service. The processing logic authorizes access to the web service by the user in the test mode (block 320). The processing logic records test data regarding the access to the web service by the user in the test mode (block 330). The processing logic generates an access policy suggestion based on the test data (block 340), and the process 300 ends.

In another embodiment, the processing logic performs additional operations to receive the requests from one or more web services to perform one or more actions, access one or more resources, or any combination thereof. The test data for these actions and accesses are recorded and analyzed to generate one or more access policy suggestions.

In a further embodiment, the processing logic stores an access policy that provides an authorization for one action or multiple actions to be performed by the web service and one resource or multiple recourses to be accessed by the web service. The processing logic records the test data by recording multiple responses during the test mode. Each of the responses corresponds to a request from the web service to perform an action, access a resource, or both. The processing logic generates the access policy suggestion to match at least one of the multiple responses recorded during the test mode.

In another embodiment, the processing logic sends the access policy suggestion to a client device. The client device may display the access policy suggestion to an operator that is defining access permissions for a user of these services. The processing logic may receive a request to apply the access policy suggestion to a user. In this case, this user is not the test user for which the test mode was run. Alternatively, the test user and the user for which the access policy suggestion is applied is the same user. That is, the test user can use the credentials of the user for which the access policy suggestion is being applied.

In another embodiment, the processing logic receives a request to terminate the test mode for the user. The processing logic, in response, terminates the test mode for the user. In one embodiment, the processing logic waits for the global end-points to update the user for the test mode as described herein.

In another embodiment, the processing logic receives an authentication and authorization request from the first web service in response to a client request, received at the web service, to perform an action or access a resource. The processing logic receives call data regarding the client request from the web service. The call data may include a user identifier, an action identifier, and a resource identifier. The processing logic can record the call data for the client request. When generating the access policy suggestion, the processing logic can generate the access policy suggestion using the call data that specifies at least the action identifier and the resource identifier.

In another embodiment, the processing logic generates a permission access response that authenticates the user and authorizes the web service to perform any action and access any resource for the user in the test mode. The processing logic receives a first request from the web service to authenticate the user and authorize a first action and access a first resource for the user in the test mode. The processing logic authorizes the first request and records the test data associated with the first request. The processing logic analyzes the test data to generate the access policy suggestion based on the first request. The access policy suggestion may include an authorization for the first action and for access to the first resource.

In another embodiment, the processing logic sends the access policy suggestion to a client device and receives a request to apply the access policy suggestion to a second user. In some cases, the second user is an actual user whereas the user of the test mode is a test user. In a further embodiment, the processing logic receives a request to edit the access policy suggestion before applying the access policy suggestion to the user. For example, the processing logic receives a request to modify the access policy suggestion to obtain a modified access policy suggestion and to apply the modified access policy suggestion to a second user.

In one embodiment, the access policy suggestion is a security policy suggestion that grants access to one or more users to perform an action, access a resource, or both. In another embodiment, the access policy suggestion includes a resource, an action, and a condition. In one embodiment, the condition may be at least one of an Internet Protocol (IP) address, a network identifier, a network address, a permission condition or requirement, a time requirement, a subscription identifier or requirement, a fee requirement, a status requirement, a hardware identifier or requirement, an operating system identifier or requirement, a location, a region, or an application identifier or requirement. The processing logic can validate user identity in connection with authorizing actions by web services and access to resources by the user or web services on behalf of the user. In another embodiment, a user identity is established through at least one of a name, a token, a password, a session identifier, or the like.

In one embodiment, the processing logic generates the access policy suggestion based on at least one of a predefined rule, access denial to a resource, or a machine learning algorithm.

In another embodiment, the processing logic receives a first request to initiate a test mode for distributed web services, where the first request includes user credentials of a test user. The processing logic receives a second request from a web service to authenticate the user, authorize an action requested by the user, and authorize access to a resource associated with the action. The processing logic sends a response to the web service to authenticate the user, authorize the action, and authorize access to the resource. The processing logic records test data regarding the second request and the response. The processing logic analyzes the test data to generate an access policy suggestion.

In another embodiment, the processing logic initiates a test mode for a user on an access management system. The processing logic receives user input related to accessing a resource and records a resource response associated with the user input. The processing logic generates a suggestion based on the resource response.

The following describes operations with an example of EC2 action and a S3 action in the test mode. These operations can be similarly performed for other web based services.

Figure 4B:
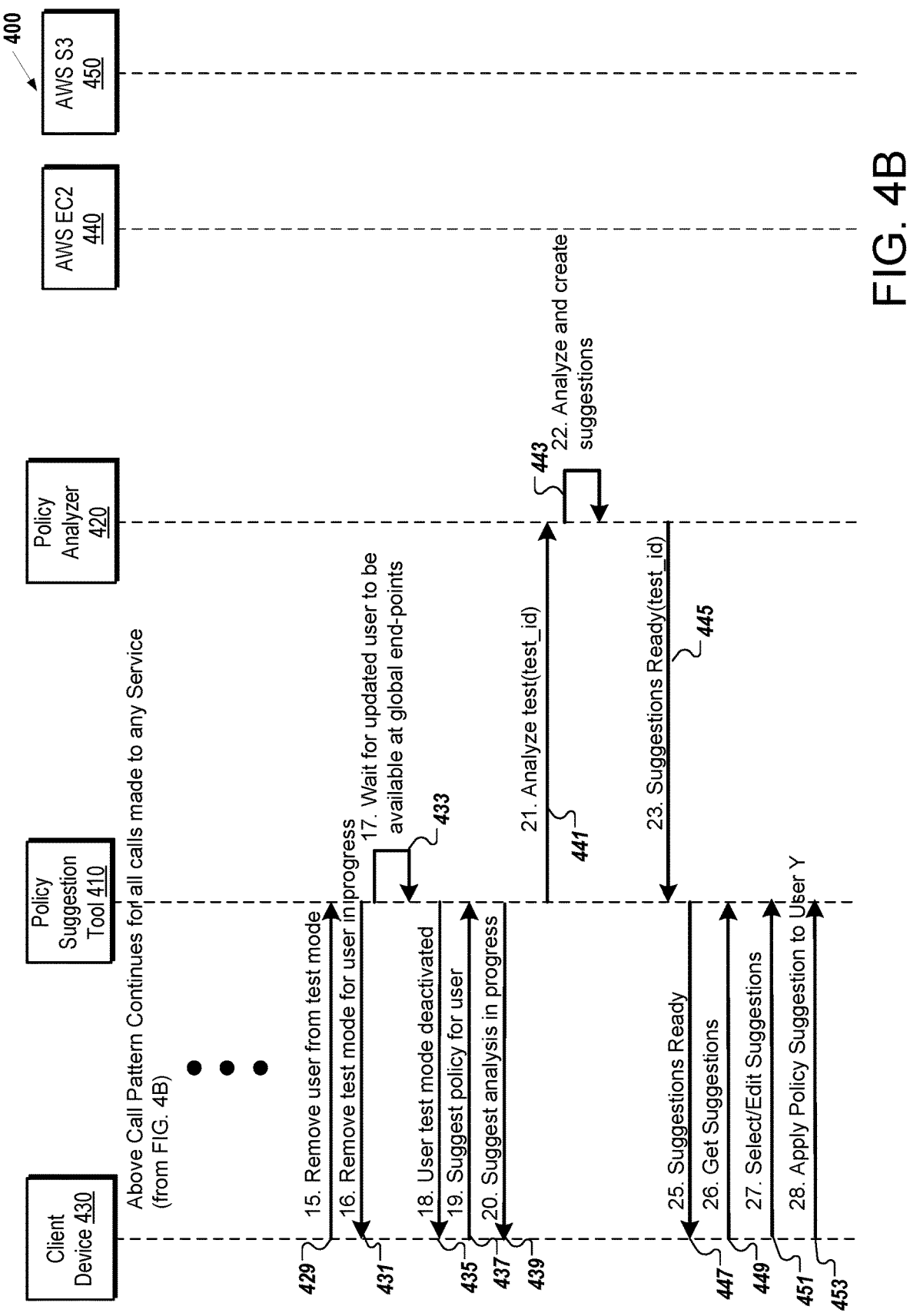

FIGS. 4A-4B illustrate a flow diagram a flow of operations 400 of with an access management system having a policy suggestion tool according to one embodiment. In the depicted embodiment, the access management system includes a policy suggestion tool 410 and a policy analyzer 420 that interact with a client device 430 and two services, namely AWS E2C 440 and AWS S3 450. The flow of operations 400 may include additional interactions with additional clients and additional services or resources.

Referring to FIG. 4A, a client device 430 sends a request 401 to the policy suggestion tool 410 to set a test user (user X) in a test mode. The policy suggestion tool 410 sends a response 403 to the client device 430 to indicate that the test mode is set for the user in progress. In one embodiment, the policy suggestion tool 410 can also notify other instances of the access management service and the policy suggestion tool 410 waits 405 for the updated user to be available at global end-points. After waiting 405 for the updated user, the policy suggestion tool 410 can send a response 407 to the client device 430 to indicate that the user test mode is activated and send a test mode identifier (e.g., TestID=test_id) to reference the test mode for access policy suggestions based on this test mode.

Once the test mode is activated, the client device 430 sends a request to a web service to perform an action and/or access a resource. In the depicted embodiment, the client device 430 sends a request 409 to launch an E2C instance to the web service AWS EC2 440. In response, AWS E2C 440 sends a request 411 to the policy suggestion tool 410 to authenticate the user X and authorize the action to be performed, namely launch an E2C instance. The policy suggestion tool 410 automatically authenticates the test user because the user X is set to be in test mode and automatically authorizes the action to be performed. The policy suggestion tool 410 sends a success response 413 to AWS E2C 440, indicating that the user X has been successfully authenticated and the action (launch E2C instance) has been successfully authorized by the access management system. Since the user is in test mode, AWS E2C 440 sends call data 415 for the test mode, including the user, an action, and a resource, if any, in connection with the request 409. The policy suggestion tool 410 sends the call authorization data 417 to the policy analyzer 420 to be recorded in connection with the test mode identifier (test_id).

Also, while in the test mode is activated, the client device 430 sends a request 419 to create a S3 bucket (e.g., CreateBucket(x)) to the web service AWS S3 450. In response, AWS S3 450 sends a request 421 to the policy suggestion tool 410 to authenticate the user X and authorize the action to be performed, namely create the S3 bucket. The policy suggestion tool 410 automatically authenticates the test user because the user X is set to be in test mode and automatically authorizes the action to be performed. The policy suggestion tool 410 sends a success response 423 to AWS S3 450, indicating that the user X has been successfully authenticated and the action (create S3) has been successfully authorized by the access management system. Since the user is in test mode, AWS S3 450 sends call data 425 for the test mode, including the user, an action, and a resource, if any, in connection with the request 419. The policy suggestion tool 410 sends the call authorization data 427 to the policy analyzer 420 to be recorded in connection with the test mode identifier (test_id).

As illustrated in FIG. 4A, the above call pattern can continue for all calls made to any of the web services.

Referring to FIG. 4B, after the above call pattern is finished for all calls made to any of the web services, the client device 430 sends a request 429 to the policy suggestion tool 410 to remove the user X from test mode. The policy suggestion tool 410 removes the user X from the test mode and sends a response 431 to the client device 430 to indicate that the test mode for user in progress is removed. The policy suggestion tool 410 can wait 433 for the updated user to be available at global end-points. After waiting 433 for the updated user, the policy suggestion tool 410 can send a response 435 to the client device 430 to indicate that the user test mode is deactivated. The client device 430 can send a request 437 to the policy suggestion tool 410 to suggest one or more access polices for the user. The policy suggestion tool 410 can send a response 439 to indicate that the suggestion analysis is in progress. The policy suggestion tool 410 sends a request 441 to the policy analyzer 420 to analyze the test data recorded, such as the recorded call authorization data for the test identifier described above with respect to 417 and 427 in FIG. 4A. The policy analyzer 420 analyzes the test data and creates 443 one or more access policy suggestions. Once the access policy suggestions are ready, the policy analyzer 420 sends a response 445 to the policy suggestion tool 410 to indicate that the suggestions are ready. The policy suggestion tool 410 sends a response 447 to the client device 430 to indicate that the access policy suggestions are ready. The client device 430 sends a request 449 to the policy suggestion tool 410 to get the access policy suggestions. The policy suggestion tool 410 can be sent to the client device 430 to be displayed to an operator of the policy suggestion tool 410. The client device 430 can send a request 451 to the policy suggestion tool 410 to select and/or edit one or more of the access policy suggestions. In response to the request 451, the policy suggestion tool 410 can select and/or edit the one or more of the access policy suggestions. The client device 430 can also send a request 453 to apply the policy suggestion to a second user (User Y). In response to the request 453, the policy suggestion tool 410 can apply the one or more access policy suggestions to user Y. The user Y may be the same user X as used in the test mode or user Y may be a different user than user X. In some cases, user X is a test user but the credentials of user Y are used to test the access needed for user Y. It should be noted that the requests 449, 451, and 453 can be combined into a single request or multiple requests. The policy suggestion tool 410 can also provide a response for any one or more of the requests 449, 451, and 453, as well.

Figure 5:
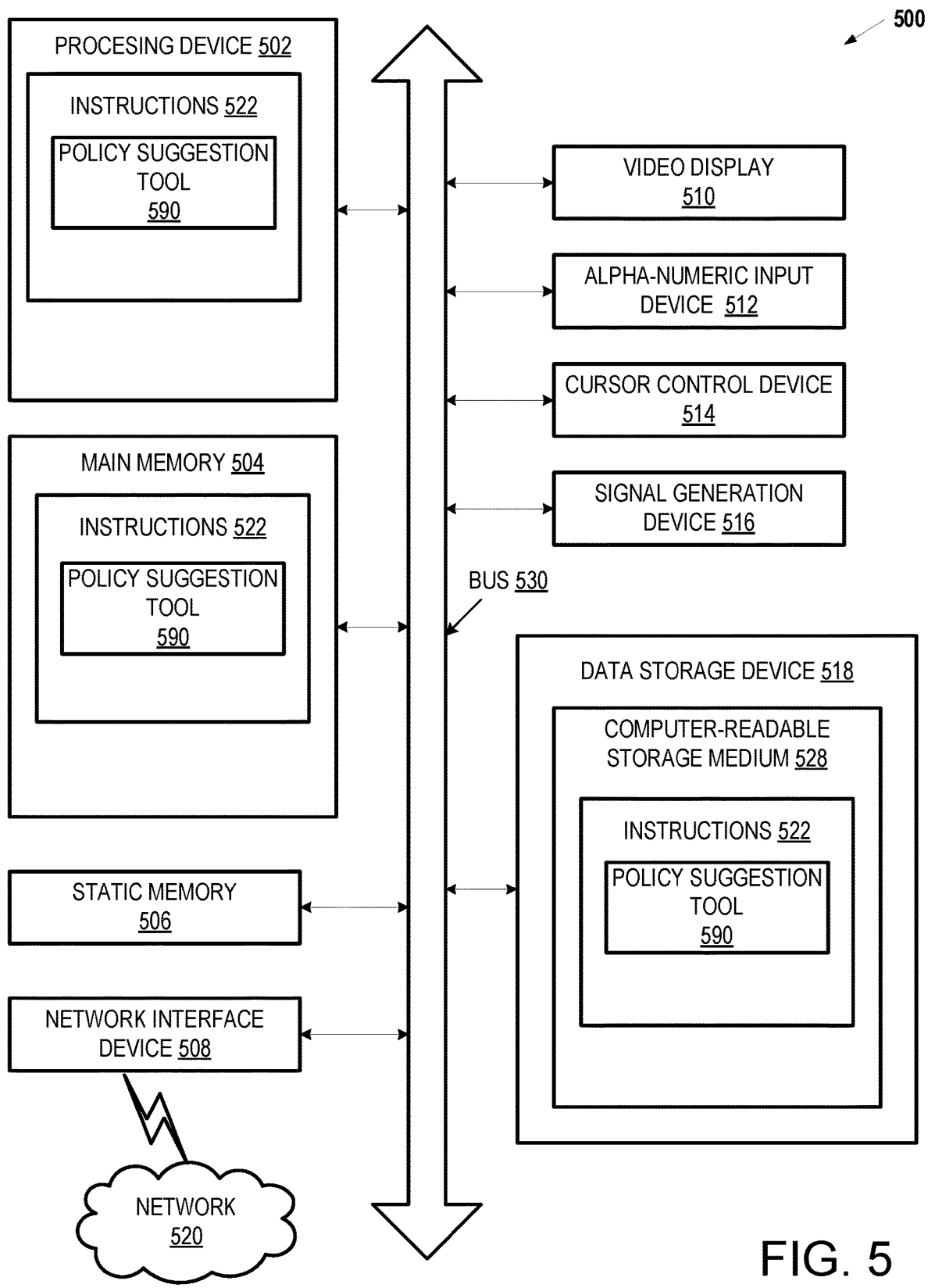
FIG. 5 illustrates a diagrammatic representation of a machine in the example form of a computer system including a set of instructions executable by a policy suggestion tool to cause the system to perform any one or more of the methodologies discussed herein

FIG. 5 illustrates a diagrammatic representation of a machine in the example form of a computer system 500 including a set of instructions 522 executable by a policy suggestion tool 590 to cause the system to perform any one or more of the methodologies discussed herein. In one embodiment, the policy suggestion tool 590 may include instructions 522 to enable execution of the processes and corresponding components shown and described in connection with FIGS. 1-4.

In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions 522 (sequential or otherwise) that specify actions to be taken by that machine. Further, while a single machine is illustrated, the term "machine" shall also be taken to include any collection of machines that individually or jointly execute a set (or multiple sets) of instructions 522 to perform any one or more of the methodologies discussed herein The example computer system 500 includes a processing device (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 518, which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. In various implementations of the present disclosure, the processing device 502 is configured to execute instructions 522 for the policy suggestion tool 590 for performing the operations and processes described herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable medium 528 on which is stored one or more sets of instructions 522 of the policy suggestion tool 590 embodying any one or more of the methodologies or functions described herein. One or more machine-readable mediums having stored thereon one or more instructions, which if performed by one or more processors, cause the one or more processors to at least any of the operations described herein.

The instructions may also reside, completely or at least partially, within the main memory 504 and/or within processing logic of the processing device 502 during execution thereof by the computer system 500, the main memory 504 and the processing device 502 also constituting computer-readable media.

The instructions 522 may further be transmitted or received over a network 520 via the network interface device 508. While the computer-readable storage medium 528 is shown in an example embodiment to be a single medium, the term "computer-readable storage medium" should be taken to include a single medium or multiple media (e.g., a centralized or distributed database, and/or associated caches and servers) that store the one or more sets of instructions 522. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "identifying", "saving", "pausing", "determining", "applying", "causing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving a first request to initiate a test mode for access to web services, wherein the first request comprises user credentials of a test user;
   notifying the web services of the test mode;
   receiving a second request from a first web service for authorization to i) perform an action or ii) access a resource for the test user in the test mode;
   authorizing the second request;
   sending a third request, comprising a test mode flag, to the first web service to indicate successful authorization of the second request, wherein the test mode flag indicates to the first web service to return test data corresponding to performing the action or accessing the resource;
   receiving and recording the test data from the first web service; and
   analyzing the test data to generate an access policy suggestion based on the test data.

2. The method of claim 1, further comprising:
   sending the access policy suggestion to a client device; and
   receiving a fourth request to apply the access policy suggestion to a user.

3. The method of claim 1, further comprising:
   receiving a fourth request to terminate the test mode for the test user; and
   terminating the test mode for the test user.

4. The method of claim 1, wherein the second request is an authentication and authorization request from the first web service in response to a client request, received at the first web service, to perform the action or access the resource, and wherein the method further comprises receiving call data regarding the client request from the first web service, the call data comprising a user identifier, an action identifier, and a resource identifier, wherein recording the test data comprises recording the call data for the client request, wherein analyzing the test data comprises creating the access policy suggestion using the call data that specifies at least the action identifier and the resource identifier.

5. The method of claim 1, further comprising:

generating a permission access response that authenticates the test user and authorizes the first web service to perform any action and access any resource for the test user in the test mode, wherein the second request comprises an authentication request to authenticate the test user and an authorization request to authorize a first action and access a first resource for the test user in the test mode; and generating the access policy suggestion based on the first request, the access policy suggestion comprising an authorization for the first action and for access to the first resource.

6. A method comprising:

initiating a test mode for a web service to be accessed by a user;

authorizing access to the web service by the user in the test mode using test user credentials associated with the user;

sending a first request, comprising a test mode flag, to the web service to indicate successful authorization, wherein the test mode flag indicates to the web service to return test data corresponding to the access;

receiving and recording the test data from the web service; and generating an access policy suggestion based on the test data.

7. The method of claim 6, further comprising storing an access policy that provides an authorization for a plurality of actions to be performed by the web service and a plurality of resources to be accessed by the web service.

8. The method of claim 6, wherein recording test data comprises recording a plurality of responses during the test mode, wherein each of the plurality of responses corresponds to a request from the web service to perform an action and access a resource, and wherein generating the access policy suggestion comprises generating the access policy suggestion to match at least one of the plurality of responses recorded during the test mode.

9. The method of claim 6, further comprising:

sending the access policy suggestion to a client device; and receiving a second request to apply the access policy suggestion to a second user, wherein the user is a test user.

10. The method of claim 6, further comprising:

receiving a second request to terminate the test mode for the user; and terminating the test mode for the user.

11. The method of claim 6, further comprising:

receiving an authentication and authorization request from the web service in response to a client request, received at the web service, to perform an action or access a resource; and receiving call data regarding the client request from the web service, the call data comprising a user identifier, an action identifier, and a resource identifier, wherein recording the test data comprises recording the call data for the client request, wherein generating the access policy suggestion comprises generating the access policy suggestion using the call data that specifies at least the action identifier and the resource identifier.

12. The method of claim 6, further comprising:

generating a permission access response that authenticates the user and authorizes the web service to perform any action and access any resource for the user in the test mode; and receiving a second request from the web service to authenticate the user and authorize a first action and access a first resource for the user in the test mode, wherein authorizing access to the web service comprises authorizing the second request, wherein generating the access policy suggestion comprises generating the access policy suggestion based on the second request, the access policy suggestion comprising an authorization for the first action and for access to the first resource.

13. The method of claim 12, further comprising:

sending the access policy suggestion to a client device; and receiving a third request to apply the access policy suggestion to a second user, wherein the user is a test user.

14. The method of claim 12, further comprising:

sending the access policy suggestion to a client device; and receiving a third request to modify the access policy suggestion and to apply the access policy suggestion to a second user, wherein the user is a test user.

15. The method of claim 6, wherein the access policy suggestion is a security policy suggestion that grants access to one or more users to perform an action, access a resource, or both.

16. The method of claim 6, wherein the access policy suggestion comprises a resource, an action, and a condition, wherein the condition specifies at least one of an Internet Protocol (IP) address, a network identifier, or a network address.

17. The method of claim 6, wherein generating the access policy suggestion based on the test data comprises generating the access policy suggestion based on at least one of a predefined rule, access denial to a resource, or a machine learning algorithm.

18. One or more non-transitory machine-readable mediums having stored thereon one or more instructions, which if performed by one or more processors, cause the one or more processors to at least:

initiate a test mode for a web service to be accessed by a user;

authorize access to the web service by the user in the test mode using test user credentials associated with the user;

send a first request, comprising a test mode flag, to the web service to indicate successful authorization, wherein the test mode flag indicates to the web service to return test data corresponding to the access;

receive and record the test data from the web service; and generate an access policy suggestion based on the test data.

19. The one or more non-transitory machine-readable mediums of claim 18, wherein the one or more instructions further cause the one or more processors to at least store an access policy that provides an authorization for a plurality of actions to be performed by the web service and a plurality of resources to be accessed by the web service.

20. The one or more non-transitory machine-readable mediums of claim 18, wherein the one or more instructions further cause the one or more processors to at least:
- send the access policy suggestion to a client device; and
- receive a second request to apply the access policy suggestion to a second user, wherein the user is a test user.

* * * * *